3,238,160
COATING COMPOSITION COMPRISING AN OIL MODIFIED ALKYD, TRIAZINE-FORMALDEHYDE AND KETONE - FORMALDEHYDE RESINS
Harold R. Hensen, Buffalo, N.Y., assignor to Pierce & Stevens Chemical Corp., Buffalo, N.Y.
No Drawing. Filed Aug. 23, 1961, Ser. No. 133,335
1 Claim. (Cl. 260—21)

The invention relates to "overprint" or "press" coating, and more particularly to coatings capable of being applied by conventional printing presses; such coatings being used for example to protect printed surfaces on paper, foils, laminations and the like, to enhance the appearance and utility thereof.

Heretofore coating materials for such purposes, such as, for example, the commonly used "press" or "overprint varnishes," have utilized various raw materials such as natural resins, synthetic resins, and vegetable oils or the like, cooked to suitable consistency to form varnish-like products. The formulation is usually extended by means of a suitable solvent such as petroleum naphtha; and driers and waxes are typically added to improve drying speed and mar resistance. Such products have been only moderately successful in attaining permanency in respect to gloss, water-white color, abrasion resistance, moisture resistance, and chemical resistance. These deficiencies are not materially improved by subsequent application of heat. Also, due to the inherent slow drying characteristics of such prior art products, it is usually necessary for the press operator to continuously riffle small stacks of the sheets as they come off the press in order to aerate them and promote drying and oxidation of the coating film to reduce blocking or sticking tendencies.

In view of the disadvantages described above, it is an object of the present invention to provide an improved coating composition which when heated after press application will convert to a highly glossy, abrasion-resistant coating of improved hardness and clarity, for application to paper products such as label stock, carton stock, gift wrap, boxboard wrap, magazine covers, book covers, playing cards, match book covers, advertising literature, etc., as well as a large variety of other surfaces. From the press operator's point of view, the composition of the present invention has working properties similar to those of conventional type press varnishes, but is vastly superior thereto in other respects as explained hereinabove. In accord with the present invention certain resin compositions formulated as will be explained hereinafter are provided to inexpensively produce at the printing establishment coatings on paper products rivaling in quality those produced by the much more expensive roller coating methods which are customarily performed by "paper converter" plants remote from the printing establishment and which have specialized equipment for applying the low viscosity type coating materials.

Generally speaking, the invention involves the admixture, in solution, of at least two resins, one of which contributes to the plasticity of the final product and the other of which contributes to the hardness of the final product. These resins are dissolved in a suitable solvent which is so related to the proportions and particular resins used as to yield a solution having a viscosity within a specified range, the solvent itself being characterized by having a boiling point within a particular range. The solution or coating composition also contains a catalyst, with all such ingredients being so balanced with respect to each other as to yield a coating composition which is stable at room temperature, of viscosity such as to permit application thereof by a printing press, and capable of conversion to a hard, clear, glossy, abrasion-resistant coating within a few seconds, upon the application of heat.

To this end, it is preferred that the above admixture involves the use of an alkyd resin or a mixture of alkyd and ketone formaldehyde resin contributing to the plasticity of the final coating and an amine resin contributing to the hardness of the coating. To this basic mixture are added suitable modifiers, if desired; a suitable solvent or mixture of solvents of such nature as to possess a boiling point within the range of about 150° C. to about 300° C. while at the same time establishing in conjunction with the total solids in solution a viscosity within the range of about 20 to 200 centistokes; and a catalyst or catalysts in the amount when necessary to cause reasonably rapid reaction of the resins at a temperature in the neighborhood of not more than about 500° F.

The modifiers involved may be of nature conventionally known in the coating art and may contribute to such properties of the coating as good drying, mar resistance, pale color, good flowing characteristics, chemical resistance, water resistance, good thermo-setting characteristics, etc.

For good drying agents such as lead, cobalt and zinc naphthenates are preferred to promote oxidation of the drying and semi-drying type alkyd resin.

Slip and mar resisting agents may include various waxes and oils such as lanolin, paraffin wax, petrolatum, silicone oils, mineral oils, and the like.

In order to enhance pale color and produce as water-white a coating as possible, optical bleaches such as the coumarin derivatives commonly used to whiten fabric and paper products may be employed.

In addition to the slip and mar resisting properties mentioned above, silicone oils such as polysiloxane dimethyl silicone and the like may be employed to enhance the water repelling character of the coating as well as to promote good flow and the deposition of a smooth film from the press.

The preferred embodiment of the invention is illustrated in Example I, although it is to be understood that this, and the subsequent examples, are illustrative of specific embodiments only and are not intended to precisely delineate the scope of the invention.

*Example I*

Solid resin: Percent by weight
    Pure drying alkyd; 42% phthalic anhydride, 41% soya—acid No. 6–14 _____ 15.0
    Triazine formaldehyde resin, M.P. 70–75° C.— acid No. 0–1 _____ 30.0
    Ketone formaldehyde, M.P. 90–100° C.—acid No. 1–2 _____ 15.0
Catalyst:
    Para toluene sulfonic acid monohydrate_____ 2.2
Modifiers:
    Paraffin wax, M.P. 60° C. _____ 0.6
    Petrolatum _____ 0.6
    4 methyl-7-diethylamino coumarin _____ 0.05
    6% rare earth naphthenate _____ 0.1
    6% manganese naphthenate _____ 0.1
    Polysiloxane fluid, 100–150 centistokes _____ 0.05
Solvent:
    Diethylene glycol monobutyl ether _____ 15.0
    Diethylene glycol monobutyl ether _____ 21.3

A portion of this coating was applied on an inked paper surface and dried for 15 seconds at 350° F. Coated papers were then placed, coated side to back side under a pressure of 2 lbs. per square inch at 150° F. for a period of one hour and showed no indication of blocking or sticking together. The coated paper was exposed to a source of intense ultra-violet radiation for two hours without appreciable color change. In addition, the coating exhibited excellent gloss characteristics, chemical resistance to acids, alkalies and solvents such as toluene, methyl ethyl ketone and the like.

*Example II*

Solid resin: Percent by weight
    Pure drying alkyd; 42% phthalic anhydride, 41% soya—acid No. 6–14 _____ 5.0
    Triazine formaldehyde resin, M.P. 70–75° C.— acid No. 0–1 _____ 38.0
    Ketone formaldehyde, M.P. 90–100° C.—acid No. 1–2 _____ 19.0
Plasticizer:
    Dioctyl phthalate _____ 10.0
Catalyst:
    Mono n-butyl acid ortho phosphate _____ 1.0
Modifiers:
    Paraffin wax, M.P. 60° C. _____ 0.5
    Petrolatum _____ 0.5
    4 methyl-7-diethylamino coumarin _____ 0.05
    6% manganese naphthenate _____ 0.10
    Dimethyl silicone, 4–40 centistokes _____ 0.05
Solvent:
    Diethylene glycol monobutyl ether acetate ____ 25.8

This paper coating was introduced on a five-color Cottrell Web Press and applied to printed book cover paper stock 8 mils in thickness, at a web speed of 400 feet per minute where it was flame and heat cured in a gas fired oven at 400° F. The resulting coating on the printed surface was an attractive, hard, glossy finish that could be rewound without any danger of blocking or sticking.

*Example III*

Solid resin: Percent by weight
    Pure drying alkyd; 42% phthalic anhydride, 41% soya—acid No. 6–14 _____ 30.0
    Triazine formaldehyde resin, M.P. 70–75° C.— acid No. 0–1 _____ 30.0
Catalyst:
    Para toluene sulfonic acid monohydrate _____ 3.0
Modifiers:
    Paraffin wax, M.P. 60° C. _____ 0.6
    Petrolatum _____ 0.6
    4 methyl-7-diethylamino coumarin _____ 0.05
    6% cobalt naphthenate _____ 0.1
    Polysiloxane fluid, 100–150 centistokes _____ 0.05
Solvent:
    Octyl alcohol _____ 5.0
    Diethylene glycol monoethyl ether acetate ____ 30.6

This solution was applied to inked paper, air dried one second, then cured three seconds at 500° F. and resulted in the appearance of a glossy, abrasion-resistant coating with good adhesion. The combination of block resistance, ultra-violet resistance, chemical resistance and solvent resistance made this coating outstanding.

The above examples, while not intended to be limiting do, nevertheless, establish certain approximate maximum and minimum relations which are necessary for the successful practice of this invention. In relation to this, reference is had to the following table:

| | Example I | Example II | Example III |
|---|---|---|---|
| Alkyd resin, percent | 15 | 5 | 30 |
| Ketone aldehyde resin, percent | 15 | 19 | |
| Amine resin, percent | 30 | 38 | 30 |
| Plasticizer, percent | | 10 | |
| Viscosity, centistokes | 60 | 100 | 100 |
| Non-volatile, percent | 64 | 74 | 69 |
| Volatile, percent | 36 | 26 | 31 |
| Drying temp., ° F | 350 | 400 | 500 |
| Drying time, sec | 15 | 9 | 3 |

For successful application on a printing press, the viscosity should lie within the range of 20 to 200 centistokes. However, for most applications, in order to achieve a practical thickness of film, a lower limit of about 50 centistokes is preferred. In relation to the upper limit of viscosity, viscosity changes rapidly above about 100 centistokes with relatively little change in composition proportions and for this reason, a viscosity of about 100 centistokes constitutes a practical upper limit, although a coating composition of 200 centistokes viscosity can be applied.

By comparing Examples I and III in the above table, it can be seen that as the resin content approaches a one-to-one ratio of alkyd and amine resins alone, viscosity increases, all other things being equal, and that the substitution of ketone aldehyde resin for part of the alkyd resin reduces viscosity. Moreover, as can be seen in Example II, reduction in the ratio of alkyd or alkyd-ketone aldehyde resin to amine resin also increases viscosity to the extent that, in Example II, reduction in viscosity to within the preferred range was accomplished by drastic substitution of ketone aldehyde resin for alkyd resin and the addition of a plasticizer.

Further, from the above table, the percentage by weight of solvent used may range between about 25% to about 35%, the remainder being substantially resin. Thus, the percentage of solvent used must be balanced with the ratio, considerations as above in regard to the resin, either with or without the use of a plasticizer.

In the selection of the resins, there are only a few presently available in solid form on a commercial scale and none available in solution with solvents such as are contemplated herein, although many others are available but only in the form of solutions in solvents which render them unsuitable for the practice of this invention. However, other and different alkyd, amine and ketone aldehyde resins can be used as they become commercially available.

I claim:

A clear coating composition having a viscosity suitable for press application to paper products, consisting essentially of a homogenous solution of an oil modified alkyd resin, triazine formaldehyde resin, a ketone formaldehyde resin having a melting point of about 90–100° C. and of acid number 1–2, a catalyst selected from the group consisting of paratoluene sulfonic acid monohydrate and mono-n-butyl acid orthophosphate, and an organic solvent selected from the group consisting of a mixture of diethylene glycol monobutyl ether and diethylene glycol monoethyl ether, diethylene glycol monobutyl ether acetate, and a mixture of diethylene glycol monoethyl ether acetate and octyl alcohol in which the alkyd resin is present in an amount ranging between about 5% to about 15% by weight, the amine resin is present in an amount ranging between about 38% to about 30%, the ketone formaldehyde resin is present in an amount ranging between about 19% to about 15% by weight, the catalyst is present in an amount of about 1–3% by weight, the balance being substantially the solvent, and wherein the solvent is of boiling point in the range of about 150° C. to about 300° C.

References Cited by the Examiner

UNITED STATES PATENTS

| | | | |
|---|---|---|---|
| 2,871,209 | 1/1959 | Shelley | 260—21 |
| 2,982,745 | 5/1961 | Gaynes | 260—21 |
| 3,027,339 | 3/1962 | Zuppinger et al. | 260—21 |
| 3,102,866 | 9/1963 | Moffett et al. | 260—21 |

LEON J. BERCOVITZ, *Primary Examiner.*

MILTON STERMAN, *Examiner.*

H. W. HAEUSSLER, C. W. IVY, *Assistant Examiners.*